(12) United States Patent
Mori et al.

(10) Patent No.: US 11,701,920 B2
(45) Date of Patent: Jul. 18, 2023

(54) DRIVING WHEEL, CARRIAGE, AND APPARATUS

(71) Applicant: NSK LTD., Tokyo (JP)

(72) Inventors: Mayuko Mori, Kanagawa (JP); Kei Kondo, Kanagawa (JP); Yasunori Ooishi, Kanagawa (JP); Satoshi Ozaki, Kanagawa (JP)

(73) Assignee: NSK LTD., Tokyo (JP)

( * ) Notice: Subject to any disclaimer, the term of this patent is extended or adjusted under 35 U.S.C. 154(b) by 375 days.

(21) Appl. No.: 16/978,849

(22) PCT Filed: Mar. 25, 2019

(86) PCT No.: PCT/JP2019/012523
§ 371 (c)(1),
(2) Date: Sep. 8, 2020

(87) PCT Pub. No.: WO2020/059189
PCT Pub. Date: Mar. 26, 2020

(65) Prior Publication Data
US 2021/0016603 A1     Jan. 21, 2021

(30) Foreign Application Priority Data
Sep. 21, 2018   (JP) ................................. 2018-177548

(51) Int. Cl.
*B60B 33/00* (2006.01)
*B62B 5/00* (2006.01)
*B62B 5/04* (2006.01)

(52) U.S. Cl.
CPC .......... *B60B 33/0092* (2013.01); *B62B 5/004* (2013.01); *B62B 5/0069* (2013.01); *B62B 5/04* (2013.01); *B62B 2301/04* (2013.01)

(58) Field of Classification Search
CPC . B60B 33/0092; B60B 33/026; B60B 33/021; B60B 33/028; B60B 33/02;
(Continued)

(56) References Cited

U.S. PATENT DOCUMENTS 7,712,184 B1 * 5/2010 Lewis ................. B60B 33/0049
16/35 R
10,717,324 B2 * 7/2020 Plate ....................... B60B 33/04
(Continued)

FOREIGN PATENT DOCUMENTS

CN      101304716 A  * 11/2008  ............. A61G 7/018
CN      105966175 A  *  9/2016
(Continued)

OTHER PUBLICATIONS

Translated JP-2004074875-A (Year: 2022).*
(Continued)

*Primary Examiner* — James A Shriver, II
*Assistant Examiner* — Ian Bryce Shelton
(74) *Attorney, Agent, or Firm* — Sughrue Mion, PLLC (57) ABSTRACT

To be self-propelled in a simple configuration and to perform manual operation smoothly and briskly. A driving wheel includes: a base portion; a rotating shaft (first shaft) rotatably provided with respect to the base portion; a rotation member rotatably provided around the rotating shaft; a drive shaft (second shaft) provided on the rotation member orthogonally to the rotating shaft; a drive wheel provided on the rotation member and rotatable around the drive shaft; a drive unit provided on the rotation member and configured to rotationally drive the drive wheel; and a lock mechanism configured to permit rotation of the rotation member with respect to the base portion, and meanwhile, to deter the rotation of the rotation member with respect to the base portion.

8 Claims, 7 Drawing Sheets

(58) Field of Classification Search
CPC ............ B60B 33/0094; B60B 33/0042; B60B 33/0076; B62B 5/004; B62B 5/0069; B62B 5/04; B62B 2301/04; B62D 7/15; A61G 12/00
See application file for complete search history.

(56) References Cited

U.S. PATENT DOCUMENTS

| | | | | |
|---|---|---|---|---|
| 2001/0029643 | A1* | 10/2001 | Schroeder | B60B 33/0039 16/35 R |
| 2007/0080000 | A1* | 4/2007 | Tobey | A61G 5/045 180/21 |
| 2009/0001740 | A1* | 1/2009 | Kofoed | A61G 1/0268 296/20 |
| 2010/0122430 | A1* | 5/2010 | Ahn | B60B 33/021 16/37 |
| 2011/0023267 | A1* | 2/2011 | Qiu | B60B 33/0057 16/46 |
| 2014/0196971 | A1* | 7/2014 | Stammberger | B60K 17/30 180/252 |
| 2016/0194025 | A1* | 7/2016 | Raspanti | B62B 3/001 180/444 |
| 2017/0008340 | A1* | 1/2017 | Iiyama | B60B 33/028 |
| 2017/0119607 | A1* | 5/2017 | Derenne | B60B 33/0092 |
| 2018/0099555 | A1* | 4/2018 | Yang | B62D 7/026 |
| 2018/0370281 | A1* | 12/2018 | Hall | B60B 33/063 |
| 2019/0193784 | A1* | 6/2019 | Wach | B60K 17/358 |
| 2021/0094349 | A1* | 4/2021 | Aubin | B60B 33/0068 |

FOREIGN PATENT DOCUMENTS

| | | | | |
|---|---|---|---|---|
| CN | 106314031 | A * | 1/2017 | ............ B60B 33/02 |
| CN | 106945467 | A * | 7/2017 | |
| CN | 108407547 | A * | 8/2018 | ............ B60B 33/00 |
| CN | 108422809 | A * | 8/2018 | |
| DE | 102016013570 | A1 * | 6/2017 | |
| DE | 102017006888 | A1 * | 3/2018 | ......... B60B 33/0092 |
| JP | 61-081203 | A | 4/1986 | |
| JP | 02-296505 | A | 12/1990 | |
| JP | 06-92272 | A | 4/1994 | |
| JP | 2003-182584 | A | 7/2003 | |
| JP | 2003182584 | A * | 7/2003 | |
| JP | 2004074875 | A * | 3/2004 | |
| JP | 2004-351234 | A | 12/2004 | |
| JP | 2008-521704 | A | 6/2008 | |
| JP | 2008521704 | A * | 6/2008 | |
| JP | 2012-066007 | A | 4/2012 | |
| JP | 5654819 | B2 * | 1/2015 | |
| JP | 2016-049921 | A | 4/2016 | |
| KR | 101857914 | B1 * | 5/2018 | |
| WO | 2006/059200 | A2 | 6/2006 | |
| WO | WO-2010037328 | A1 * | 4/2010 | ......... B60B 33/0007 |
| WO | WO-2010039102 | A1 * | 4/2010 | ......... B60B 33/0039 |
| WO | WO-2012042806 | A1 * | 4/2012 | ............ B60K 7/0007 |
| WO | WO-2012048750 | A1 * | 4/2012 | ............ B62D 11/02 |
| WO | 2013/071932 | A1 | 5/2013 | |
| WO | WO-2014173490 | A1 * | 10/2014 | ......... B60B 33/0042 |
| WO | WO-2015118449 | A1 * | 8/2015 | ............ B60B 33/00 |

OTHER PUBLICATIONS

Notification of reasons for refusal of Japanese Patent Application No. 2019-549498 dated Oct. 8, 2019.
Notification of reasons for refusal of Japanese Patent Application No. 2019-549498 dated Feb. 4, 2020.
International Search Report of PCT/JP2019/012523 dated Jun. 4, 2019 [PCT/ISA/210].
Extended European Search Report dated Feb. 21, 2023 in European Application No. 19862091.6.

* cited by examiner

DRIVING WHEEL, CARRIAGE, AND APPARATUS

CROSS REFERENCE TO RELATED APPLICATIONS

This application is a National Stage of International Application No. PCT/JP2019/012523, filed Mar. 25, 2019, claiming priority to Japanese Patent Application No. 2018-177548, filed Sep. 21, 2018.

FIELD

The present invention relates to a driving wheel, a carriage, and an apparatus.

BACKGROUND

A traveling carriage capable of being self-propelled by a motor includes a configuration to turn drive wheels. For example, in a differential caster described in Patent Literature 1, a horizontal shaft is rotatably provided with a vertical shaft as a center, a pair of driving wheels supported on both end sides of this horizontal shaft have each a built-in electric motor, and by driving each driving wheel independently by each electric motor, each driving wheel turns with the vertical shaft as the center.

Furthermore, in a wheel drive device described in Patent Literature 2, while a first rotating shaft and a second rotating shaft that are coaxially provided with a turning shaft perpendicular to a housing and are rotatable relative to each other are rotationally driven by a first motor and a second motor attached to the housing, a first wheel and a second wheel rotatable around a horizontal shaft are provided at positions offset from the turning shaft on a turning portion that is rotatably provided relative to the housing with the turning shaft as the center, a transmission unit configured to transmit the rotation from the first rotating shaft to the first wheel and transmit the rotation from the second rotating shaft to the second wheel is provided, and by driving each wheel independently by each motor, each wheel turns about the turning shaft.

CITATION LIST

Patent Literature

Patent Literature 1: Japanese Laid-open Patent Publication No. 2012-66007 A
Patent Literature 2: Japanese Laid-open Patent Publication No. 2016-49921 A

SUMMARY

Technical Problem

In Patent Literature 1 and Patent Literature 2, because the respective motors to drive the pair of wheels are needed, there is a problem in that the weight increases. In Patent Literature 1, because the horizontal shaft is arranged intersecting with the vertical shaft, there is a problem in that the turning operation cannot smoothly be performed in manual operation operated by human power. In Patent Literature 2, because gears and pulleys are used as a configuration to transmit the driving of each motor to each wheel, there are problems in that the relevant configuration is complicated, the weight increases, and noise may arise. In addition, in Patent Literature 2, there is a problem in that a load caused by the configuration to transmit the driving in manual operation operated by human power may arise.

Incidentally, for example, for conveying medicine in a hospital, a carriage that can be self-propelled up to a sickroom of a hospital ward that is relatively away from a storehouse and that can be operated manually (pushed by hand) in the sickroom has been desired.

The present disclosure has been made in view of the above-described problems, and an object of the disclosure is to provide a driving wheel, a carriage, and an apparatus that are self-propelled in a simple configuration and are able to perform manual operation smoothly and briskly.

Solution to Problem

To achieve the above object, a driving wheel according to one embodiment of the present disclosure includes a base portion, a first shaft rotatably provided with respect to the base portion, a rotation member rotatably provided around the first shaft, a second shaft provided on the rotation member orthogonally to the first shaft, a drive wheel provided at a position offset from a shaft center of the first shaft with respect to the rotation member and rotatable around the second shaft, a drive unit provided on the rotation member and configured to rotationally drive the drive wheel, a lock mechanism configured to turn into an unlock condition permitting rotation of the rotation member with respect to the base portion, and meanwhile, to turn into a lock condition deterring the rotation of the rotation member with respect to the base portion, and a controller configured to control the drive unit and the lock mechanism. The controller is configured to control a first operation driving the drive unit while turning the lock mechanism into the lock condition, a second operation driving the drive unit while turning the lock mechanism into the unlock condition, and rotating the rotation member around the first shaft along with the drive wheel, and a third operation driving the drive wheel around the second shaft by an external force while turning the lock mechanism into the unlock condition, and rotating the rotation member around the first shaft along with the drive wheel.

Thus, the driving wheel can change the direction of the drive wheel by rotating the rotation member by permitting the rotation of the rotation member with respect to the base portion by the lock mechanism while rotationally driving the drive wheel by the drive unit provided on the rotation member. Meanwhile, the driving wheel can travel by fixing the rotation member by deterring the rotation of the rotation member with respect to the base portion by the lock mechanism while rotationally driving the drive wheel by the drive unit provided on the rotation member. Furthermore, because there is no need to provide the drive unit on the first shaft, the driving wheel can perform manual operation in which the rotation member is freely rotated around the first shaft without a load by permitting the rotation of the rotation member by the lock mechanism and the drive wheel is driven by an external force. As a result, the driving wheel can be self-propelled in a configuration for which low cost and lightweight are achieved in a simple configuration, and can perform the manual operation smoothly and briskly.

Thus, because the drive wheel is provided at a position offset from the shaft center of the first shaft, in rotating the rotation member by permitting the rotation of the rotation member with respect to the base portion by the lock mechanism while rotationally driving the drive wheel, the driving wheel can smoothly perform the rotational movement of the rotation member around the first shaft.

As a desirable embodiment of the driving wheel, the second shaft is provided at a position where a shaft center thereof is offset from a shaft center of the first shaft.

Thus, because the shaft center of the second shaft is provided at a position offset from the shaft center of the first shaft, in the manual operation in which the rotation member is rotated freely by permitting the rotation of the rotation member with respect to the base portion by the lock mechanism and the drive wheel is driven by an external force, the driving wheel can perform the rotational movement of the rotation member around the first shaft in all directions of the rotational directions. As a result, as the position adjustment in moving in the manual operation is possible, the traveling performance can be improved.

As a desirable embodiment of the driving wheel, further includes a third shaft provided on the rotation member coaxially with the second shaft, a driven wheel rotatably provided around the third shaft, and a brake mechanism configured to brake rotation of the driven wheel. The controller is configured to control the brake mechanism to turn the brake mechanism into a brake-release condition in the first operation, turn the brake mechanism into a brake condition in the second operation, and turn the brake mechanism into the brake-release condition in the third operation.

Thus, because providing the driven wheel assists in rotating the drive wheel, the driving wheel can briskly perform the rotational movement of the rotation member. In particular, by braking the rotation of the driven wheel by the brake mechanism, in rotating the rotation member by permitting the rotation of the rotation member with respect to the base portion by the lock mechanism while rotationally driving the drive wheel, the driving wheel can give a turning force to the rotational direction to the rotation member along with rotationally driving the drive wheel, can reduce the moving amount of the entire driving wheel that arises along with the rotational movement of the rotation member, and can rotationally move the rotation member efficiently.

To achieve the above object, a carriage according to one embodiment of the present disclosure includes any one of the driving wheel described above, and a carriage main body on which the driving wheel is attached.

Thus, in the carriage, the driving wheel can change the direction of the drive wheel by rotating the rotation member by permitting the rotation of the rotation member with respect to the base portion by the lock mechanism while rotationally driving the drive wheel by the drive unit provided on the rotation member. Meanwhile, in the carriage, the driving wheel can travel by fixing the rotation member by deterring the rotation of the rotation member with respect to the base portion by the lock mechanism while rotationally driving the drive wheel by the drive unit provided on the rotation member. Furthermore, in the carriage, because there is no need to provide the drive unit on the first shaft, the driving wheel can perform manual operation in which the rotation member is freely rotated around the first shaft without a load by permitting the rotation of the rotation member by the lock mechanism and the drive wheel is driven by an external force. As a result, in the carriage, the driving wheel can be self-propelled in a configuration for which low cost and lightweight are achieved in a simple configuration, and can perform the manual operation smoothly and briskly.

To achieve the above object, an apparatus according to one embodiment of the present disclosure includes any one of the driving wheel described above, a carriage main body on which the driving wheel is attached, and equipment attached to the carriage main body.

Thus, in the apparatus, the driving wheel can change the direction of the drive wheel by rotating the rotation member by permitting the rotation of the rotation member with respect to the base portion by the lock mechanism while rotationally driving the drive wheel by the drive unit provided on the rotation member. Meanwhile, in the apparatus, the driving wheel can travel by fixing the rotation member by deterring the rotation of the rotation member with respect to the base portion by the lock mechanism while rotationally driving the drive wheel by the drive unit provided on the rotation member. Furthermore, in the apparatus, because there is no need to provide the drive unit on the first shaft, the driving wheel can perform manual operation in which the rotation member is freely rotated around the first shaft without a load by permitting the rotation of the rotation member by the lock mechanism and the drive wheel is driven by an external force. As a result, in the apparatus, the driving wheel can be self-propelled in a configuration for which low cost and lightweight are achieved in a simple configuration, and can perform the manual operation smoothly and briskly.

Advantageous Effects of Invention

According to the present disclosure, it is possible to be self-propelled in a simple configuration, and to perform manual operation smoothly and briskly.

DESCRIPTION OF EMBODIMENT

The following describes a form to implement the invention (an embodiment) in detail while referring to the accompanying drawings. Note that the present invention is not intended to be limited by the following embodiment. The constituent elements in the following embodiment include elements easily achieved by a person skilled in the art, elements being substantially the same, and elements being within a scope of what is called equivalents. Moreover, the constituent elements disclosed in the following embodiment can be combined as appropriate.

Embodiment

Figure 1:
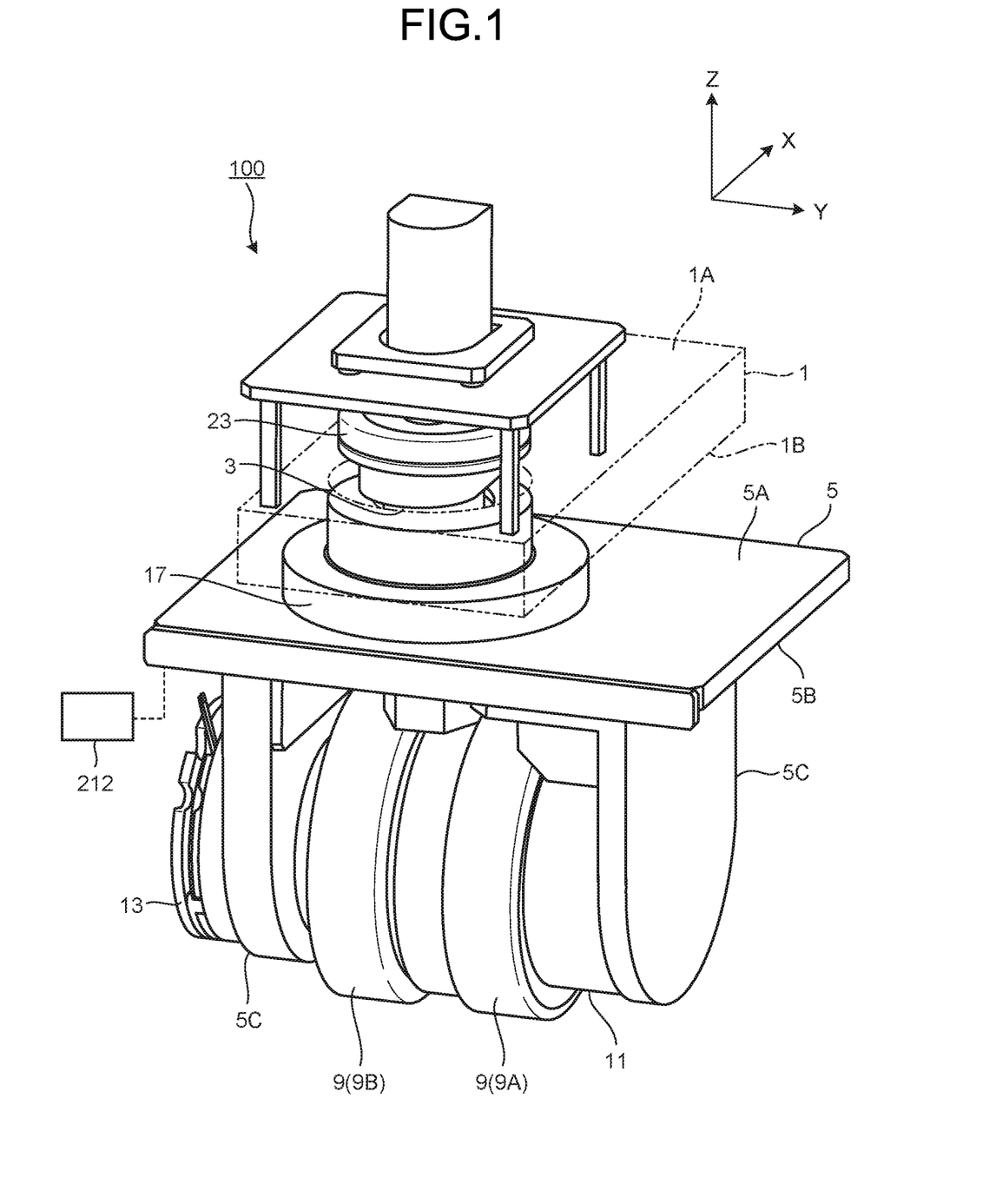
FIG. 1 is a perspective view illustrating a configuration example of a driving wheel according to an embodiment.

FIG. 1 is a perspective view illustrating a configuration example of a driving wheel of the present embodiment. FIG.

Figure 2:
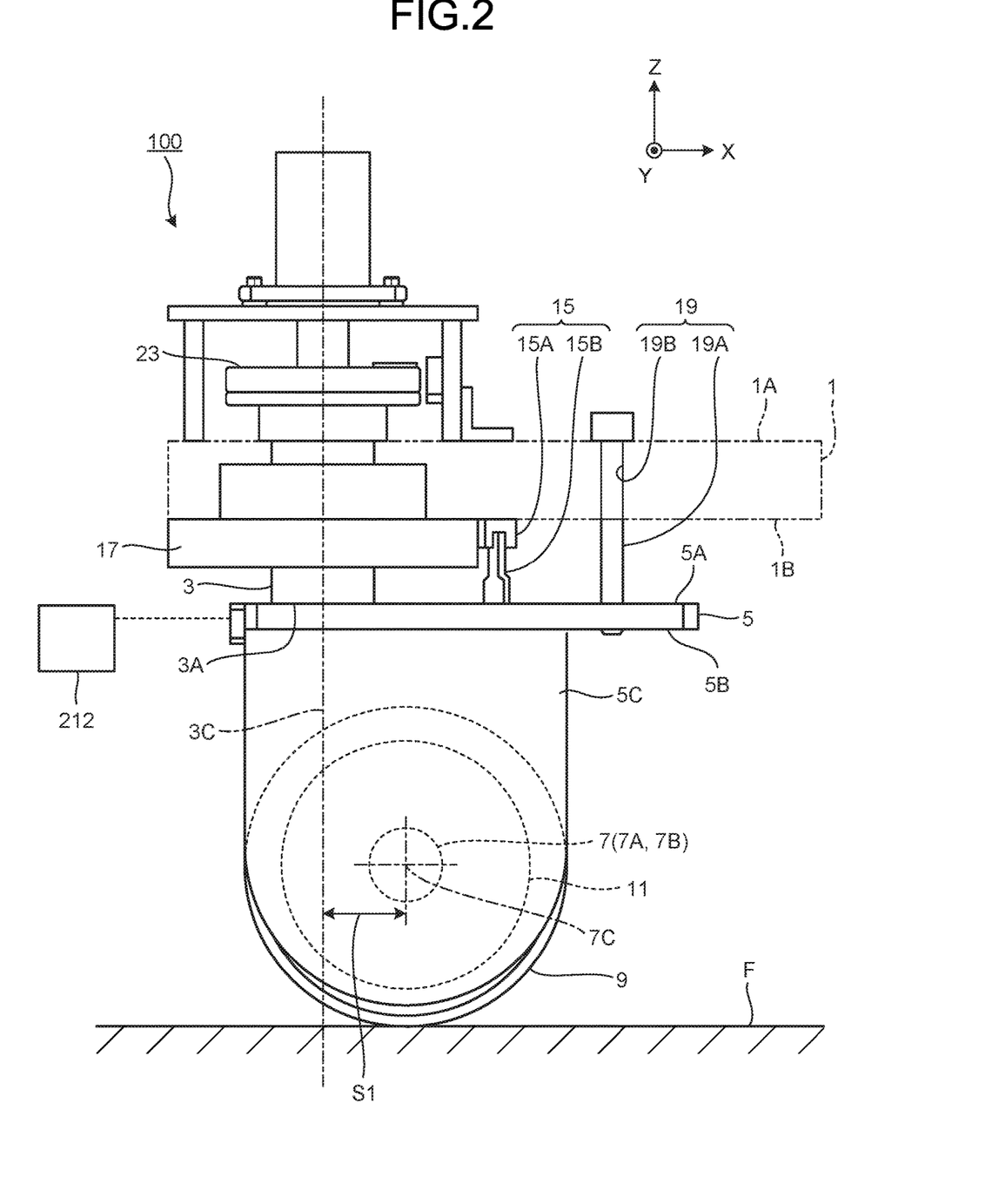
FIG. 2 is a side view illustrating a configuration example of the driving wheel of the present embodiment.
Figure 3:
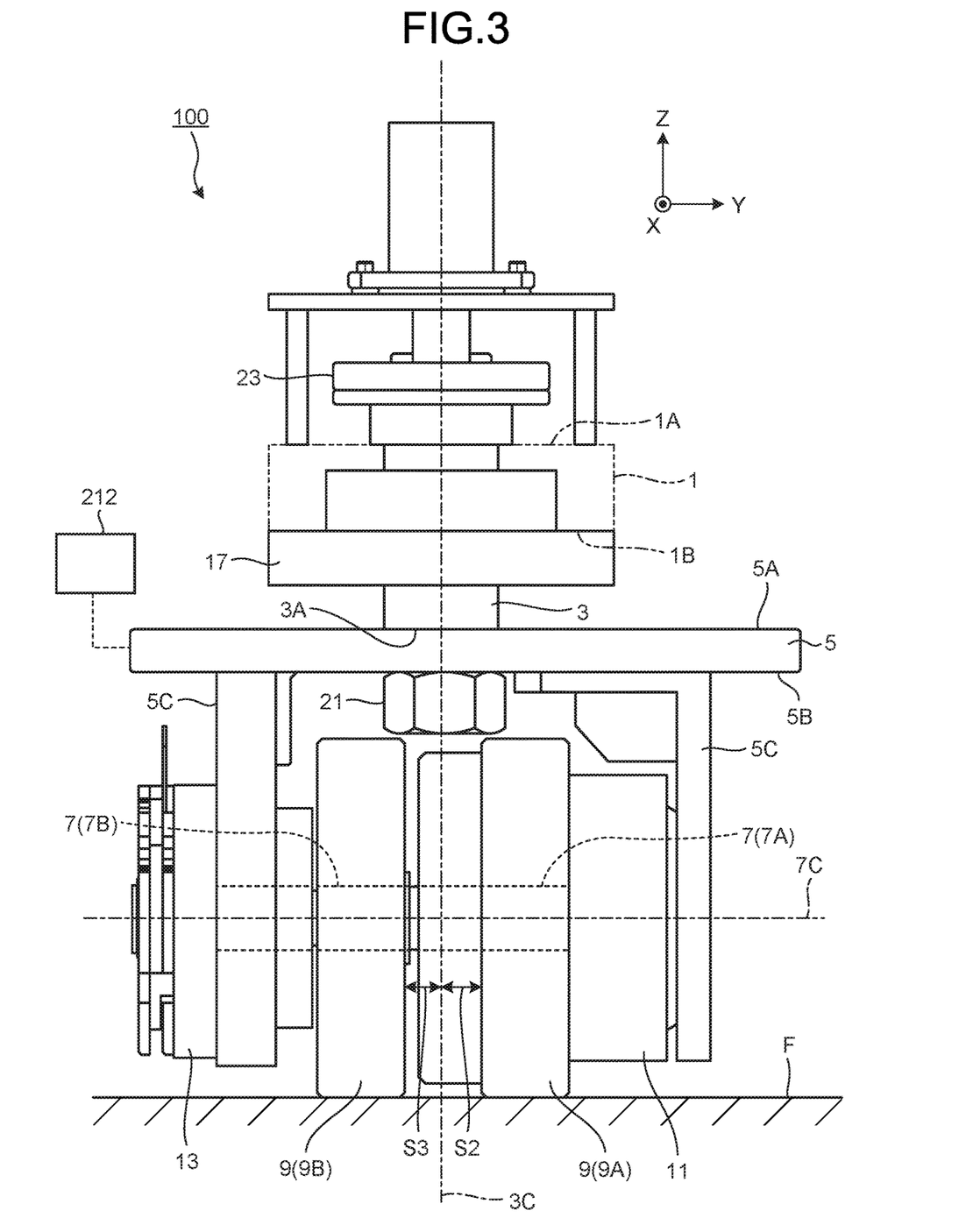
FIG. 3 is a front view illustrating a configuration example of the driving wheel of the present embodiment.
Figure 4:
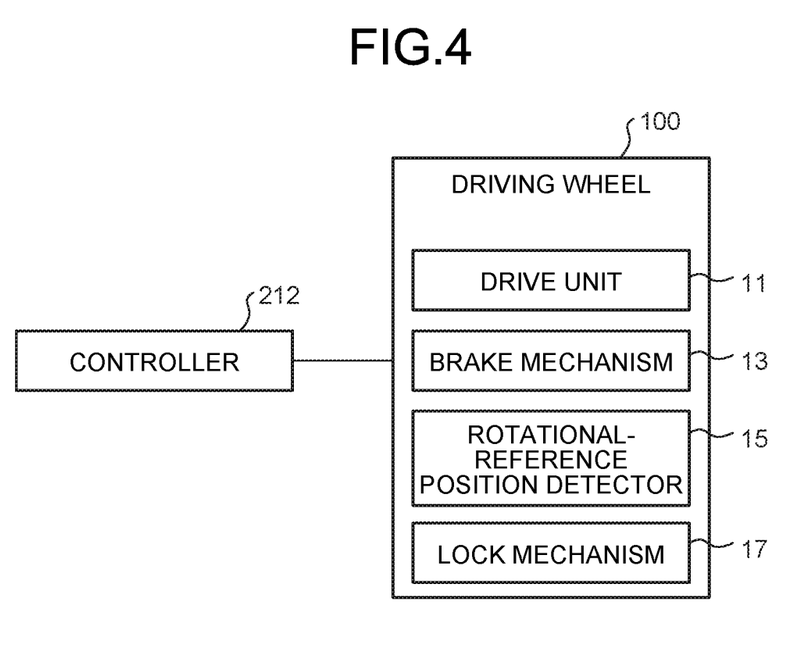
FIG. 4 is a block diagram illustrating a configuration example of a carriage of the present embodiment.

2 is a side view illustrating a configuration example of the driving wheel of the present embodiment. FIG. 3 is a front view illustrating a configuration example of the driving wheel of the present embodiment. FIG. 4 is a block diagram illustrating a configuration example of a carriage of the present embodiment.

In each drawing explaining the present embodiment, the height direction of a driving wheel 100 is indicated in a Z direction. In a plane orthogonal to the Z direction, a direction of the driving wheel 100 going straight ahead is indicated in an X direction and the direction orthogonal to the X direction is indicated in a Y direction. In the present embodiment, in the Z direction, a direction away from a grounding surface F is referred to as an upper side and a direction approaching the grounding surface F is referred to as a lower side.

As illustrated in FIG. 1 to FIG. 4, the driving wheel 100 of the present embodiment is provided based on a base portion 1 to be fixed, and includes a rotating shaft (first shaft) 3, a rotation member 5, a revolving shaft 7, a wheel 9, a drive unit 11, a brake mechanism 13, a rotational-reference position detector 15, a lock mechanism 17, a rotation-range restriction mechanism 19, and a controller 212.

The base portion 1 is a bar material, a frame material, or a plate material made of metal, for example. In the present embodiment, the base portion 1 is formed as a plate material, and while an upper surface 1A is directed to the upper side in the Z direction and a lower surface 1B is directed to the lower side in the Z direction, the upper surface 1A and the lower surface 1B are arranged along an X-Y plane orthogonal to the Z direction.

The rotating shaft 3 is provided on the base portion 1. The rotating shaft 3 is provided extending in the Z direction and running through the base portion 1. The rotating shaft 3 is rotatably provided with respect to the base portion 1.

The rotation member 5 is a frame material or a plate material made of metal, for example. In the present embodiment, the rotation member 5 is formed as a plate material, and while an upper surface 5A is directed to the upper side in the Z direction and a lower surface 5B is directed to the lower side in the Z direction, the upper surface 5A and the lower surface 5B are arranged along the X-Y plane orthogonal to the Z direction. The rotation member 5 is fixed to a lower end 3A of the rotating shaft 3 with a bolt 21 that runs through in the Z direction from the lower surface 5B while the upper surface 5A is brought into contact with the lower end 3A of the rotating shaft 3 running through the lower surface 1B of the base portion 1. Accordingly, the rotation member 5 rotates in conjunction with the rotating shaft 3 and is rotatably provided around the rotating shaft 3 relatively to the base portion 1. The rotation member 5 is provided with a pair of side plates 5C extending toward the lower side from the lower surface 5B and facing each other. The side plates 5C are indicated, in FIG. 1 to FIG. 3, such that they are provided facing each other in the Y direction.

The revolving shaft 7 is provided on the rotation member 5. The revolving shaft 7 is arranged along the X-Y plane orthogonal to the Z direction. The revolving shaft 7 is indicated, in FIG. 1 to FIG. 3, such that it is provided extending in the Y direction. The revolving shaft 7 includes a drive shaft (second shaft) 7A and a driven shaft (third shaft) 7B. The drive shaft 7A and the driven shaft 7B are coaxially provided but are each provided independently.

Furthermore, the revolving shaft 7, as illustrated in FIG. 2, is provided at a position where a shaft center 7C that is the rotation center thereof is offset by an offset amount S1 away from a shaft center 3C that is the rotation center of the rotating shaft 3. That is, the revolving shaft 7 is arranged at a position where the shaft center 7C does not intersect with the shaft center 3C of the rotating shaft 3.

The wheel 9 is a circular wheel that is metal-made, is rubber-made, or is made up of a rubber material that is wound around an outer circumference of metal, for example. The wheel 9 is rotatably provided around the revolving shaft 7 while the center of the circle is arranged on the revolving shaft 7. The wheel 9, in the present embodiment, includes a drive wheel 9A and a driven wheel 9B. The drive wheel 9A and the driven wheel 9B are formed with the same outer diameter. The drive wheel 9A is attached to the drive shaft 7A of the revolving shaft 7 and is rotatably provided around the drive shaft 7A. In the present embodiment, the drive wheel 9A is fixed onto the drive shaft 7A. The drive shaft 7A is rotatably supported on one of the side plates 5C of the rotation member 5. Furthermore, the driven wheel 9B is attached to the driven shaft 7B of the revolving shaft 7 and is rotatably provided around the driven shaft 7B. In the present embodiment, the driven wheel 9B is fixed onto the driven shaft 7B. The driven shaft 7B is rotatably supported with respect to the other of the side plates 5C of the rotation member 5.

Furthermore, in the wheel 9, as illustrated in FIG. 3, the drive wheel 9A is provided at a position offset away from the shaft center 3C of the rotating shaft 3 by an offset amount S2. That is, the drive wheel 9A is arranged at a position not intersecting with the shaft center 3C of the rotating shaft 3. Furthermore, in the wheel 9, the driven wheel 9B is provided at a position offset away from the shaft center 3C of the rotating shaft 3 by an offset amount S3. That is, the driven wheel 9B is arranged at a position not intersecting with the shaft center 3C of the rotating shaft 3.

The drive unit 11 rotationally drives the drive wheel 9A. The drive unit 11 is attached to the one of the side plates 5C of the rotation member 5. The drive unit 11 is a direct drive motor (DD motor), for example, and although not illustrated, includes a stator and a rotor. In the drive unit 11, the drive shaft 7A is attached to the rotor and, along with the rotation of the rotor, the drive wheel 9A fixed to the drive shaft 7A is rotationally driven together with the drive shaft 7A. A power supply 220 (see FIG. 8 and FIG. 9) that supplies current to the drive unit 11 is provided on the base portion 1, and the supply of the current to the drive unit 11 from the power supply 220 is carried out via the rotation member 5 from the rotating shaft 3 by a slip ring 23 arranged on the rotating shaft 3. Furthermore, when the direct drive motor is applied to the drive unit 11, by halting the supply of the current (excitation off) to the drive unit 11, the drive wheel 9A can be rotated freely without a load.

The brake mechanism 13 brakes the rotation of the driven wheel 9B. The brake mechanism 13 is attached to the other of the side plates 5C of the rotation member 5. The brake mechanism 13, although not illustrated, includes an actuator, for example. The brake mechanism 13, by the actuator, permits the rotation of the driven shaft 7B, and meanwhile, restricts the rotation of the driven shaft 7B. Accordingly, the brake mechanism 13 brakes the rotation of the driven wheel 9B fixed onto the driven shaft 7B. The supply of current to the brake mechanism 13 is, as with the drive unit 11, carried out via the rotation member 5 from the rotating shaft 3 by the slip ring 23.

The rotational-reference position detector 15 detects a reference position that is a reference in relative rotational movement of the rotation member 5 with respect to the base portion 1. In the present embodiment, the rotational-reference position detector 15, as illustrated in FIG. 2, includes a detection sensor 15A and a detection piece 15B. The detection sensor 15A, for example, is a light projecting/ receiving sensor that is made up of a light projection portion and a light receiving portion, and detects a situation where the light illuminated by the light projection portion has reached the light receiving portion and a situation where the light illuminated by the light projection portion was blocked and did not reach the receiving portion. The detection sensor 15A is fixed to the lower surface 1B of the base portion 1, for example. The detection piece 15B is arranged between the light projection portion and the light receiving portion of the detection sensor 15A and blocks the light illuminated by the light projection portion. The detection piece 15B is fixed to the upper surface 5A of the rotation member 5. In the rotational-reference position detector 15, in relative rotational movement of the rotation member 5 with respect to the base portion 1, the detection piece 15B is arranged between the light projection portion and the light receiving portion of the detection sensor 15A at the reference position and blocks the light illuminated by the light projection portion. In the present embodiment, the reference position, as illustrated in FIG. 1 to FIG. 3, is a rotational position of the rotation member 5 in a situation where the revolving shaft 7 (shaft center 7C) is arranged along the Y direction.

The lock mechanism 17 permits the rotation of the rotation member 5 with respect to the base portion 1, and meanwhile, deters the rotation of the rotation member 5 with respect to the base portion 1. In the present embodiment, the lock mechanism 17 is provided on the base portion 1. The lock mechanism 17 is arranged such that the rotating shaft 3 passes therethrough. The lock mechanism 17, although not illustrated, includes an actuator, for example. The lock mechanism 17, by the actuator, permits the rotation of the rotating shaft 3, and meanwhile, deters the rotation of the rotating shaft 3. Accordingly, the lock mechanism 17 permits the rotation of the rotation member 5 that rotates in conjunction with the rotating shaft 3, and meanwhile, deters the rotation of the rotation member 5.

The rotation-range restriction mechanism 19 restricts the range of rotation of the rotation member 5 with respect to the base portion 1. In the present embodiment, the rotation-range restriction mechanism 19, as illustrated in FIG. 2, includes a pin 19A projecting toward the upper side from the upper surface 5A of the rotation member 5, and a circular arc hole 19B that is formed on the base portion 1 and through which the pin 19A passes. The circular arc hole 19B is formed with the rotating shaft 3 as the center. Accordingly, the rotation-range restriction mechanism 19 restricts the range of rotation of the rotation member 5 with respect to the base portion 1 within the range of the circular arc hole 19B by the engagement of the pin 19A and the circular arc hole 19B.

The controller 212 controls the driving wheel 100. The controller 212 includes a computer system. The computer system includes a processor such as a CPU, and a memory such as a ROM or a RAM. As illustrated in FIG. 4, the controller 212 outputs, based on a program stored in the memory in advance and data that is input from the drive unit 11 and the rotation-range restriction mechanism 19, control signals to the drive unit 11, the brake mechanism 13, and the lock mechanism 17.

Figure 5:
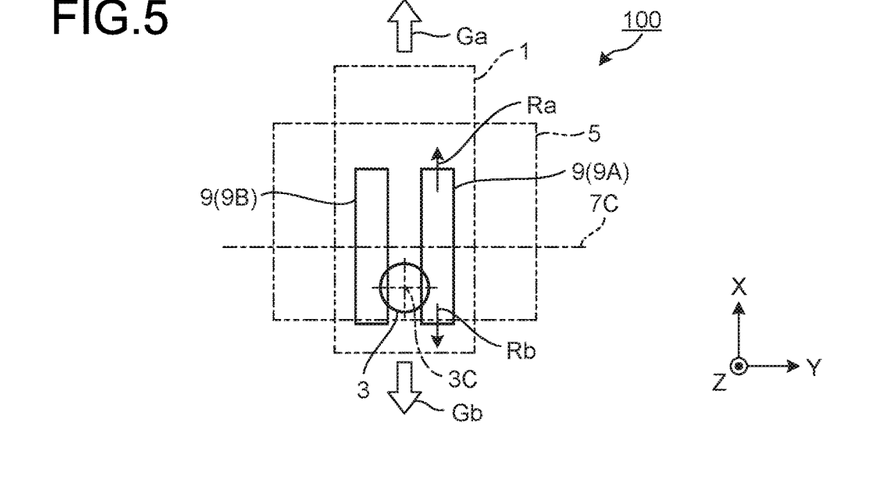
FIG. 5 is a schematic plan view illustrating an example of operation of the driving wheel of the present embodiment.
Figure 6:
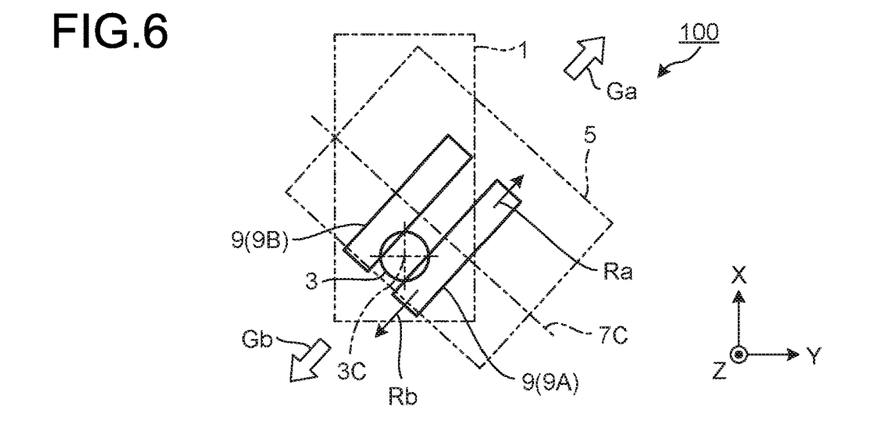
FIG. 6 is a schematic plan view illustrating an example of the operation of the driving wheel of the present embodiment.
Figure 7:
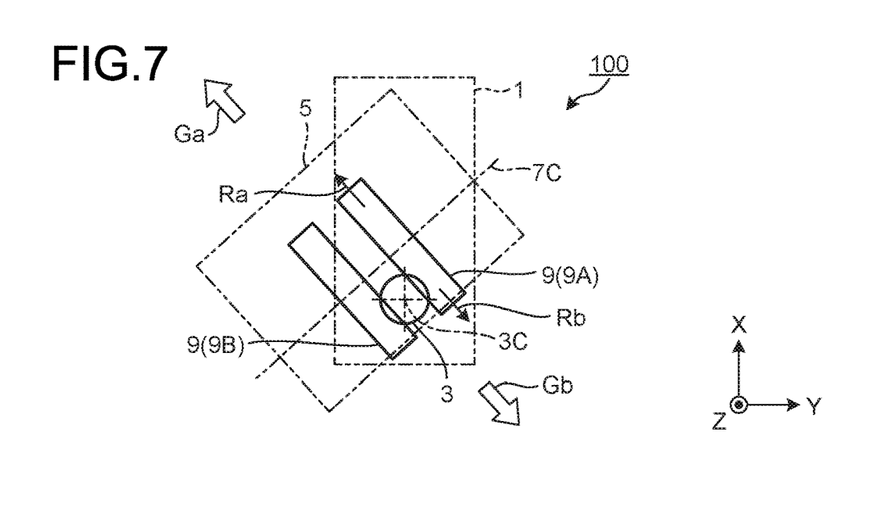
FIG. 7 is a schematic plan view illustrating an example of the operation of the driving wheel of the present embodiment.

FIG. 5 to FIG. 7 are schematic plan views illustrating examples of the operation of the driving wheel of the present embodiment.

In FIG. 5 to FIG. 7, the base portion 1 is exemplified as a moving target to be moved. The directions of movement of the base portion 1 are indicated with reference signs Ga and Gb, and Ga represents a forward movement and Gb represents a backward movement. Furthermore, in FIG. 5 to FIG. 7, the rotational directions of the drive wheel 9A are indicated with reference signs Ra and Rb as the directions of movement of an upper half portion in planar view, and Ra represents a normal rotation and Rb represents a reverse rotation.

In the example illustrated in FIG. 5, in the driving wheel 100, the rotational position of the rotation member 5 is at the reference position where the shaft center 7C of the revolving shaft 7 is arranged along the Y direction. The reference position is detected by the rotational-reference position detector 15. The driving wheel 100, at this reference position, turns into a brake-release condition in which the rotation of the driven wheel 9B is permitted by the brake mechanism 13 and turns into a lock condition in which the rotation of the rotation member 5 with respect to the base portion 1 is deterred by the lock mechanism 17. Under this condition, in the driving wheel 100, the base portion 1 performs the forward movement Ga, as the drive wheel 9A performs the normal rotation Ra. Meanwhile, in the driving wheel 100, the base portion 1 performs the backward movement Gb, as the drive wheel 9A performs the reverse rotation Rb. This operation is referred to as self-propelled operation.

In the example illustrated in FIG. 6, the driving wheel 100, at the reference position of the rotation member 5 illustrated in FIG. 5, turns into a brake condition in which the rotation of the driven wheel 9B is restricted by the brake mechanism 13 and turns into an unlock condition in which the rotation of the rotation member 5 with respect to the base portion 1 is permitted by the lock mechanism 17. Under this condition, in the driving wheel 100, as the drive wheel 9A performs the reverse rotation Rb, the rotation member 5 rotationally moves in the clockwise direction around the rotating shaft 3 with respect to the base portion 1 as the brake condition of the driven wheel 9B and the unlock condition of the rotation member 5 are combined together. The driving wheel 100 can measure the rotation angle of the rotation member 5 by the detection of the reference position by the rotational-reference position detector 15, and by the rotation amount at the time of the reverse rotation Rb of the drive wheel 9A from the preset reference position. As a result, in the driving wheel 100, as illustrated in FIG. 6, the rotation member 5 performs relative rotational movement around the rotating shaft 3 with respect to the base portion 1. Thereafter, the driving wheel 100 turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, in the driving wheel 100, the base portion 1 performs the forward movement Ga in an oblique upper right direction in FIG. 6, as the drive wheel 9A performs the normal rotation Ra. Meanwhile, in the driving wheel 100, the base portion 1 performs the backward movement Gb in an oblique lower left direction in FIG. 6, as the drive wheel 9A performs the reverse rotation Rb. This operation is referred to as self-propelled operation.

In the example illustrated in FIG. 7, the driving wheel 100, at the reference position of the rotation member 5 illustrated in FIG. 5, turns into the brake condition in which the rotation of the driven wheel 9B is restricted by the brake mechanism 13 and turns into the unlock condition in which the rotation of the rotation member 5 with respect to the base portion 1 is permitted by the lock mechanism 17. Under this condition, in the driving wheel 100, as the drive wheel 9A performs the normal rotation Ra, the rotation member 5 rotationally moves in the counter-clockwise direction around the rotating shaft 3 with respect to the base portion 1 as the brake condition of the driven wheel 9B and the unlock condition of the rotation member 5 are combined together. The driving wheel 100 can measure the rotation angle of the rotation member 5 by the detection of the reference position by the rotational-reference position detector 15 and by the rotation amount at the time of the normal rotation Ra of the drive wheel 9A from the preset reference position. As a result, in the driving wheel 100, as illustrated in FIG. 7, the rotation member 5 performs relative rotational movement around the rotating shaft 3 with respect to the base portion 1. Thereafter, the driving wheel 100 turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, in the driving wheel 100, the base portion 1 performs the forward movement Ga in an oblique upper left direction in FIG. 7, as the drive wheel 9A performs the normal rotation Ra. Meanwhile, in the driving wheel 100, the base portion 1 performs the backward movement Gb in an oblique lower right direction in FIG. 7, as the drive wheel 9A performs the reverse rotation Rb. This operation is referred to as self-propelled operation.

Furthermore, the driving wheel 100 turns into the brake-release condition in which the rotation of the driven wheel 9B is permitted by the brake mechanism 13 and turns into the unlock condition in which the rotation of the rotation member 5 with respect to the base portion 1 is permitted by the lock mechanism 17. Under this condition, when an external force is given to the base portion 1 along the X-Y plane (grounding surface F (see FIG. 2 and FIG. 3)), as the rotation member 5 freely performs rotational movement around the rotating shaft 3 while the drive wheel 9A and the driven wheel 9B are driven, the driving wheel 100 performs the forward movement Ga and the backward movement Gb to all directions along the X-Y plane (grounding surface F). This operation is referred to as manual operation that is operated by human power, and particularly, referred to as omni-directional manual operation.

Furthermore, the driving wheel 100 turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, when an external force in the directions of the forward movement Ga and the backward movement Gb is given, as the rotational movement of the rotation member 5 is deterred while the drive wheel 9A and the driven wheel 9B are driven, the driving wheel 100 performs the forward movement Ga and the backward movement Gb only to the directions in which the drive wheel 9A and the driven wheel 9B are facing. This operation is referred to as manual operation that is operated by human power, and particularly, referred to as forward/backward-turn manual operation.

As in the foregoing, the driving wheel 100 of the present embodiment includes the base portion 1, the rotating shaft (first shaft) 3 rotatably provided with respect to the base portion 1, the rotation member 5 rotatably provided around the rotating shaft 3, the drive shaft (second shaft) 7A provided on the rotation member 5 orthogonally to the rotating shaft 3, the drive wheel 9A provided on the rotation member 5 and rotatable around the drive shaft 7A, the drive unit 11 provided on the rotation member 5 and configured to rotationally drive the drive wheel 9A, and the lock mechanism 17 configured to permit the rotation of the rotation member 5 with respect to the base portion 1, and meanwhile, to deter the rotation of the rotation member 5 with respect to the base portion 1.

Thus, the driving wheel 100 can change the direction of the drive wheel 9A by rotating the rotation member 5 by permitting the rotation of the rotation member 5 with respect to the base portion 1 by the lock mechanism 17 while rotationally driving the drive wheel 9A by the drive unit 11 provided on the rotation member 5. Meanwhile, the driving wheel 100 can travel by fixing the rotation member 5 by deterring the rotation of the rotation member 5 with respect to the base portion 1 by the lock mechanism 17 while rotationally driving the drive wheel 9A by the drive unit 11 provided on the rotation member 5. Furthermore, because there is no need to provide the drive unit 11 on the rotating shaft 3, the driving wheel 100 can perform the manual operation in which the rotation member 5 is freely rotated around the rotating shaft 3 without a load by permitting the rotation of the rotation member 5 by the lock mechanism 17 and the drive wheel 9A is driven by the external force. As a result, the driving wheel 100 can be self-propelled in a configuration for which low cost and lightweight are achieved in a simple configuration, and can perform the manual operation smoothly and briskly. Furthermore, in the driving wheel 100, if the direct drive motor is applied to the drive unit 11, the drive wheel 9A can be rotated freely without a load by turning the excitation off, and the manual operation can be performed more smoothly and briskly.

Furthermore, in the driving wheel 100 of the present embodiment, it is preferable that the drive wheel 9A be provided at a position offset from the shaft center 3C of the rotating shaft 3.

Thus, because the drive wheel 9A is provided at a position offset from the shaft center 3C of the rotating shaft 3, in rotating the rotation member 5 by permitting the rotation of the rotation member 5 with respect to the base portion 1 by the lock mechanism 17 while rotationally driving the drive wheel 9A, the driving wheel 100 can smoothly perform the rotational movement of the rotation member 5 around the rotating shaft 3.

Furthermore, in the driving wheel 100 of the present embodiment, it is preferable that the drive shaft 7A be provided such that the shaft center 7C thereof is provided at a position offset from the shaft center 3C of the rotating shaft 3.

Thus, because the shaft center 7C of the drive shaft 7A is provided at a position offset from the shaft center 3C of the rotating shaft 3, in the manual operation in which the rotation member 5 is rotated freely by permitting the rotation of the rotation member 5 with respect to the base portion 1 by the lock mechanism 17 and the drive wheel 9A is driven by an external force, the driving wheel 100 can perform the rotational movement of the rotation member 5 around the rotating shaft 3 in all directions of the rotational directions. As a result, as the position adjustment in moving in the manual operation is possible, the traveling performance can be improved.

Furthermore, in the driving wheel 100 of the present embodiment, it is preferable that the driven shaft (third shaft) 7B provided on the rotation member 5 coaxially with the drive shaft 7A, the driven wheel 9B rotatably provided around the driven shaft 7B, and the brake mechanism 13 configured to brake the rotation of the driven wheel 9B be further provided.

Thus, because providing the driven wheel 9B assists in rotating the drive wheel 9A, the driving wheel 100 can briskly perform the rotational movement of the rotation member 5. In particular, by braking the rotation of the driven wheel 9B by the brake mechanism 13, in rotating the rotation member 5 by permitting the rotation of the rotation member 5 with respect to the base portion 1 by the lock mechanism 17 while rotationally driving the drive wheel 9A, the driving wheel 100 can give a turning force to the rotational direction to the rotation member 5 along with rotationally driving the drive wheel 9A, can reduce the moving amount of the base portion 1 that arises along with the rotational movement of the rotation member 5, and can rotationally move the rotation member 5 efficiently. As a result, the driving wheel 100 can perform smooth traveling.

Figure 8:
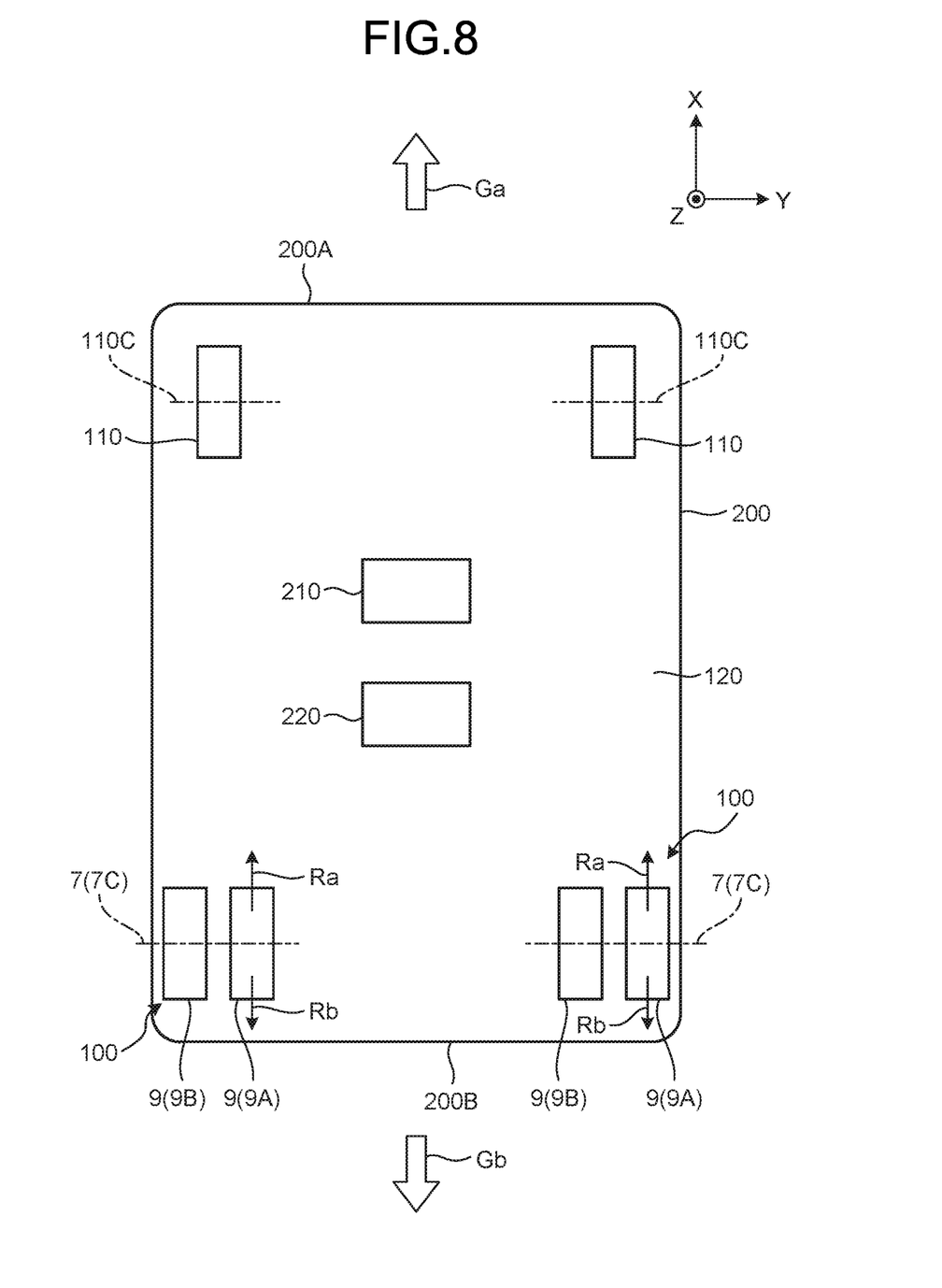
FIG. 8 is a schematic plan view illustrating a configuration example of the carriage of the present embodiment.
Figure 9:
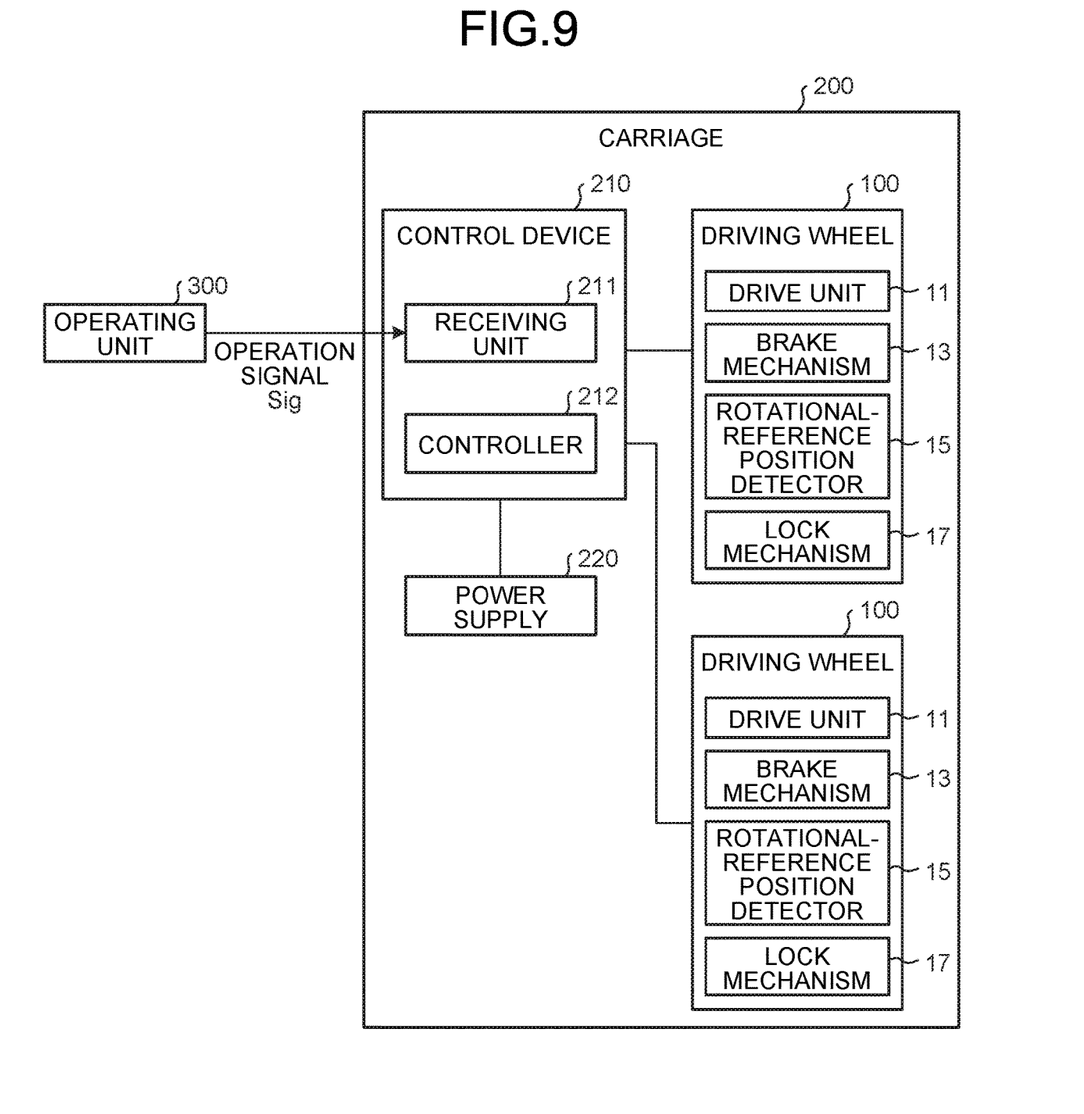
FIG. 9 is a block diagram illustrating a configuration example of the carriage of the present embodiment.

FIG. 8 is a schematic plan view illustrating a configuration example of the carriage of the present embodiment. FIG. 9 is a block diagram illustrating a configuration example of the carriage of the present embodiment.

As illustrated in FIG. 8 and FIG. 9, a carriage 200 includes the driving wheels 100, driven wheels 110, a carriage main body 120, a control device 210, and the power supply 220.

The carriage main body 120 is a frame made of steel, for example. The carriage main body 120 can, by configuring a flat surface along the X-Y plane, place a conveyance object on the relevant surface. That is, the carriage 200 can be configured as an unmanned carrier (automatic guided vehicle (AGV)). Furthermore, the carriage 200 can be configured as a traveling apparatus by arranging equipment along the X-Y plane of the carriage main body 120. Examples of the apparatus include a robot, medical equipment, and other various apparatuses. Although not depicted, on the carriage main body 120, a handle portion extending upward is provided. The handle portion is formed in a downward U-shape and is used for an operator to grip it.

The driving wheels 100 and the driven wheels 110 are attached to the carriage main body 120. The driving wheel 100 is in the above-described configuration. The driven wheel 110 is rotatably attached around a shaft center 110C provided extending in the Y direction, and is in a configuration in which the direction is not changed on the X-Y plane and it only rotates. The driving wheels 100 are each attached, at a rear side 200B on the side in the direction of the backward movement Gb of the carriage 200, to both sides in the Y direction of a bottom surface of the carriage main body 120. In the driving wheel 100, the base portion 1 is fixed onto the carriage main body 120. The driven wheels 110, as illustrated in FIG. 8, are each attached, at the front side 200A on the side in the direction of the forward movement Ga of the carriage 200, to both sides in the Y direction of the bottom surface of the carriage main body 120, for example.

The control device 210 and the power supply 220 are attached to the carriage main body 120. The control device 210 and the power supply 220 are attached to the bottom surface of the carriage main body 120, for example. As illustrated in FIG. 9, the control device 210 includes a receiving unit 211 and the controller 212. The controller 212 includes a computer system. The computer system includes a processor such as a CPU, and a memory such as a ROM or a RAM. The receiving unit 211 has a function of receiving an operation signal Sig transmitted from an operating unit 300. The controller 212, as illustrated in FIG. 9, outputs, based on the operation signal Sig received by the receiving unit 211 and based on a program stored in the memory in advance and data input from the drive unit 11 and the rotation-range restriction mechanism 19, control signals to the drive unit 11, the brake mechanism 13, and the lock mechanism 17. The function of controlling the driving wheel 100 is provided. For example, the controller 212 is connected to the driving wheel 100 and the power supply 220 via wiring. The controller 212 is supplied with current from the power supply 220. As illustrated in FIG. 9, when the carriage 200 includes a plurality of driving wheels 100, the control device 210 controls the driving wheels 100 individually. The operating unit 300 may be arranged at a position away from the carriage 200, or may be attached to the handle portion or the like of the carriage 200.

In this carriage 200 (apparatus), by referring to the example of the driving wheel of the present embodiment in FIG. 5 to FIG. 7, the operation will be described.

In the moving directions of the carriage 200, Ga represents a forward movement and Gb represents a backward movement. Furthermore, in the rotational directions of the drive wheel 9A in each driving wheel 100, as the moving directions of an upper half portion in planar view, Ra represents a normal rotation and Rb represents a reverse rotation.

In the embodiment illustrated in FIG. 8, in the carriage 200, the rotational position of the rotation member 5 of each driving wheel 100, as illustrated in FIG. 5, is at the reference position where the shaft center 7C of the revolving shaft 7 is arranged along the Y direction. The reference position is detected by the rotational-reference position detector 15. Each driving wheel 100, at this reference position, turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, the carriage 200 performs the forward movement Ga, as the drive wheel 9A of each driving wheel 100 performs the normal rotation Ra. Meanwhile, the carriage 200 performs the backward movement Gb, as the drive wheel 9A of each driving wheel 100 performs the reverse rotation Rb. This operation is referred to as self-propelled operation.

The carriage 200, at the reference position of the rotation member 5 illustrated in FIG. 5, turns each driving wheel 100 into the brake condition in which the rotation of the driven wheel 9B is restricted by the brake mechanism 13 and turns it into the unlock condition in which the rotation of the rotation member 5 with respect to the base portion 1 is permitted by the lock mechanism 17. Under this condition, in each driving wheel 100, as the drive wheel 9A performs the reverse rotation Rb, as illustrated in FIG. 6, the rotation member 5 rotationally moves in the clockwise direction around the rotating shaft 3 with respect to the carriage main body 120 as the brake condition of the driven wheel 9B and the unlock condition of the rotation member 5 are combined together. Each driving wheel 100 can measure the rotation angle of the rotation member 5 by the detection of the reference position by the rotational-reference position detector 15, and by the rotation amount at the time of the reverse rotation Rb of the drive wheel 9A from the preset reference position. As a result, in each driving wheel 100, as illustrated in FIG. 6, the rotation member 5 performs relative rotational movement around the rotating shaft 3 with respect to the carriage main body 120. Thereafter, each driving wheel 100 turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, in the carriage 200, as the drive wheel 9A of each driving wheel 100 performs the normal rotation Ra, the rear side 200B moves to the right direction in FIG. 8 and the orientation of the front side 200A is changed facing the left. Meanwhile, in the carriage 200, as the drive wheel 9A of each driving wheel 100 performs the reverse rotation Rb, the rear side 200B moves to the left direction in FIG. 8 and the orientation of the front side 200A is changed facing the right. Thereafter, each driving wheel 100 turns into the brake condition in which the rotation of the driven wheel 9B is restricted by the brake mechanism 13 and turns into the unlock condition in which the rotation of the rotation member 5 with respect to the base portion 1 is permitted by the lock mechanism 17, and by driving the drive wheel 9A in this condition, the position of the rotation member 5 is returned to the reference position illustrated in FIG. 5. Subsequently, the carriage 200 performs the forward movement Ga in a condition in which the orientation of the front side 200A was changed, as the drive wheel 9A of each driving wheel 100 performs the normal rotation Ra. Meanwhile, the carriage 200 performs the backward movement Gb in a condition in which the orientation of the front side 200A was changed, as the drive wheel 9A of each driving wheel 100 performs the reverse rotation Rb. This operation is referred to as self-propelled operation.

The carriage 200, at the reference position of the rotation member 5 illustrated in FIG. 5, turns each driving wheel 100 into the brake condition in which the rotation of the driven wheel 9B is restricted by the brake mechanism 13 and turns it into the unlock condition in which the rotation of the rotation member 5 with respect to the base portion 1 is permitted by the lock mechanism 17. Under this condition, in each driving wheel 100, as the drive wheel 9A performs the normal rotation Ra, as illustrated in FIG. 7, the rotation member 5 rotationally moves in the counter-clockwise direction around the rotating shaft 3 with respect to the carriage main body 120 as the brake condition of the driven wheel 9B and the unlock condition of the rotation member 5 are combined together. Each driving wheel 100 can measure the rotation angle of the rotation member 5 by the detection of the reference position by the rotational-reference position detector 15, and by the rotation amount at the time of the normal rotation Ra of the drive wheel 9A from the preset reference position. As a result, in each driving wheel 100, as illustrated in FIG. 7, the rotation member 5 performs relative rotational movement around the rotating shaft 3 with respect to the carriage main body 120. Thereafter, each driving wheel 100 turns into the brake-release condition in which the rotation of the driven wheel 9B is permitted by the brake mechanism 13 and turns into the lock condition in which the rotation of the rotation member 5 with respect to the base portion 1 is deterred by the lock mechanism 17. Under this condition, in the carriage 200, as the drive wheel 9A of each driving wheel 100 performs the normal rotation Ra, the rear side 200B moves to the left direction in FIG. 8 and the orientation of the front side 200A is changed facing the right. Meanwhile, in the carriage 200, as the drive wheel 9A of each driving wheel 100 performs the reverse rotation Rb, the rear side 200B moves to the right direction in FIG. 8 and the orientation of the front side 200A is changed facing the left. Thereafter, each driving wheel 100 turns into the brake condition in which the rotation of the driven wheel 9B is restricted by the brake mechanism 13 and turns into the unlock condition in which the rotation of the rotation member 5 with respect to the base portion 1 is permitted by the lock mechanism 17, and by driving the drive wheel 9A in this condition, the position of the rotation member 5 is returned to the reference position illustrated in FIG. 5. Subsequently, the carriage 200 performs the forward movement Ga in a condition in which the orientation of the front side 200A was changed, as the drive wheel 9A of each driving wheel 100 performs the normal rotation Ra. Meanwhile, the carriage 200 performs the backward movement Gb in a condition in which the orientation of the front side 200A was changed, as the drive wheel 9A of each driving wheel 100 performs the reverse rotation Rb. This operation is referred to as self-propelled operation.

Furthermore, the carriage 200 turns each driving wheel 100 into the brake-release condition in which the rotation of the driven wheel 9B is permitted by the brake mechanism 13 and turns it into the unlock condition in which the rotation of the rotation member 5 with respect to the base portion 1 is permitted by the lock mechanism 17. Under this condition, when an external force is given along the X-Y plane (grounding surface F), in each driving wheel 100, as the rotation member 5 freely performs rotational movement around the rotating shaft 3 while the drive wheel 9A and the driven wheel 9B are driven, the carriage 200 performs the forward movement Ga and the backward movement Gb to all directions along the X-Y plane (grounding surface F). This operation is referred to as manual operation that is operated by human power, and particularly, referred to as omni-directional manual operation.

Furthermore, the carriage 200 turns each driving wheel 100 into the brake-release condition in which the rotation of the driven wheel 9B is permitted by the brake mechanism 13 and turns it into the lock condition in which the rotation of the rotation member 5 with respect to the base portion 1 is deterred by the lock mechanism 17. Under this condition, when an external force is given along the X-Y plane (grounding surface F), in each driving wheel 100, as the rotational movement of the rotation member 5 is deterred while the drive wheel 9A and the driven wheel 9B are driven, the carriage 200 performs the forward movement Ga and the backward movement Gb only in the directions in which the drive wheel 9A and the driven wheel 9B are facing. This operation is referred to as manual operation that is operated by human power, and particularly, referred to as forward/backward-turn manual operation.

As in the foregoing, in the carriage 200 and the apparatus of the present embodiment, the driving wheel 100 includes the rotating shaft (first shaft) 3, the rotation member 5 rotatably provided around the rotating shaft 3, the drive shaft (second shaft) 7A provided on the rotation member 5 orthogonally to the rotating shaft 3, the drive wheel 9A rotatably provided around the drive shaft 7A, the drive unit 11 provided on the rotation member 5 and configured to rotationally drive the drive wheel 9A, and the lock mechanism 17 configured to permit the rotation of the rotation member 5, and meanwhile, to deter the rotation of the rotation member 5.

Thus, in the carriage 200 and the apparatus, the driving wheel 100 can change the direction of the drive wheel 9A by rotating the rotation member 5 by permitting the rotation of the rotation member 5 with respect to the base portion 1 by the lock mechanism 17 while rotationally driving the drive wheel 9A by the drive unit 11 provided on the rotation member 5. Meanwhile, in the carriage 200 and the apparatus, the driving wheel 100 can travel by fixing the rotation member 5 by deterring the rotation of the rotation member 5 with respect to the base portion 1 by the lock mechanism 17 while rotationally driving the drive wheel 9A by the drive unit 11 provided on the rotation member 5. Furthermore, in the carriage 200 and the apparatus, because there is no need to provide the drive unit 11 on the rotating shaft 3, the driving wheel 100 can perform the manual operation in which the rotation member 5 is freely rotated around the rotating shaft 3 without a load by permitting the rotation of the rotation member 5 with respect to the base portion 1 by the lock mechanism 17 and the drive wheel 9A is driven by the external force. As a result, the carriage 200 and the apparatus, in the driving wheel 100, can be self-propelled in a configuration for which low cost and lightweight are achieved in a simple configuration, and can perform the manual operation smoothly and briskly. Furthermore, in the driving wheel 100, if the direct drive motor is applied to the drive unit 11, the drive wheel 9A can be rotated freely without a load by turning the excitation off, and the carriage 200 and the apparatus can perform the manual operation more smoothly and briskly.

Furthermore, in the carriage 200 and the apparatus of the present embodiment, it is preferable that the drive wheel 9A of the driving wheel 100 be provided at a position offset from the shaft center 3C of the rotating shaft 3.

Thus, because the drive wheel 9A is provided at a position offset from the shaft center 3C of the rotating shaft 3, in rotating the rotation member 5 by permitting the rotation of the rotation member 5 with respect to the base portion 1 by the lock mechanism 17 while rotationally driving the drive wheel 9A, the carriage 200 and the apparatus can, in the driving wheel 100, smoothly perform the rotational movement of the rotation member 5 around the rotating shaft 3. As a result, the carriage 200 and the apparatus can perform smooth traveling.

Furthermore, in the carriage 200 and the apparatus of the present embodiment, it is preferable that the drive shaft 7A of the driving wheel 100 be provided at a position where the shaft center 7C thereof is offset from the shaft center 3C of the rotating shaft 3.

Thus, because the shaft center 7C of the drive shaft 7A is provided at a position offset from the shaft center 3C of the rotating shaft 3, in the manual operation in which the rotation member 5 is rotated freely by permitting the rotation of the rotation member 5 with respect to the base portion 1 by the lock mechanism 17 and the drive wheel 9A is driven by an external force, the carriage 200 and the apparatus, in the driving wheel 100, can perform the rotational movement of the rotation member 5 around the rotating shaft 3 in all directions of the rotational directions. As a result, as the position adjustment in moving in the manual operation is possible, the traveling performance can be improved.

Furthermore, in the carriage 200 and the apparatus of the present embodiment, it is preferable that the driving wheel 100 be further provided with the driven shaft (third shaft) 7B provided on the rotation member 5 coaxially with the drive shaft 7A, the driven wheel 9B rotatably provided around the driven shaft 7B, and the brake mechanism 13 configured to brake the rotation of the driven wheel 9B.

Thus, because providing the driven wheel 9B assists in rotating the drive wheel 9A, the carriage 200 and the apparatus, in the driving wheel 100, can briskly perform the rotational movement of the rotation member 5. In particular, by braking the rotation of the driven wheel 9B by the brake mechanism 13, in rotating the rotation member 5 by permitting the rotation of the rotation member 5 with respect to the base portion 1 by the lock mechanism 17 while rotationally driving the drive wheel 9A, the driving wheel 100 can give a turning force to the rotational direction to the rotation member 5 along with rotationally driving the drive wheel 9A, can reduce the moving amount of the carriage main body 120 that arises along with the rotational movement of the rotation member 5, and can rotationally move the rotation member 5 efficiently. As a result, the carriage 200 and the apparatus can perform smooth traveling.

Note that, in the carriage 200 and the apparatus, the number and the arrangement of the driving wheels 100 are not limited to the above-described configuration. For example, in the carriage 200 and the apparatus, in the form of four wheels illustrated in FIG. 8, the driving wheels 100 may be attached to the front side 200A of the carriage 200 and the driven wheels 110 may be attached to the rear side 200B of the carriage 200. Furthermore, although not illustrated, in the carriage 200 and the apparatus, in a form of three wheels or more, the driving wheel 100 may be one and the other wheels may all be the driven wheels 110. Although not illustrated, in the carriage 200 and the apparatus, in a form of three wheels or more, all the wheels may be the driving wheels 100, without having the driven wheels 110. That is, the carriage 200 and the apparatus, in a form of three wheels or more, only need to have at least one driving wheel 100. Even in such a configuration, it is possible to be self-propelled in a simple configuration and to perform the manual operation smoothly and briskly.

REFERENCE SIGNS LIST

1 BASE PORTION
1A UPPER SURFACE
1B LOWER SURFACE
3 ROTATING SHAFT (FIRST SHAFT)
3A LOWER END
3C SHAFT CENTER
5 ROTATION MEMBER
5A UPPER SURFACE
5B LOWER SURFACE
5C SIDE PLATE
7 REVOLVING SHAFT
7A DRIVE SHAFT (SECOND SHAFT)
7B DRIVEN SHAFT (THIRD SHAFT)
7C SHAFT CENTER
9 WHEEL
9A DRIVE WHEEL
9B DRIVEN WHEEL
11 DRIVE UNIT
13 BRAKE MECHANISM
15 ROTATIONAL-REFERENCE POSITION DETECTOR
15A DETECTION SENSOR
15B DETECTION PIECE
17 LOCK MECHANISM
19 ROTATION-RANGE RESTRICTION MECHANISM
19A PIN
19B CIRCULAR ARC HOLE
21 BOLT
23 SLIP RING
100 DRIVING WHEEL
110 DRIVEN WHEEL
110C SHAFT CENTER
120 CARRIAGE MAIN BODY
200 CARRIAGE
200A FRONT SIDE
200B REAR SIDE
210 CONTROL DEVICE
211 RECEIVING UNIT
212 CONTROLLER
220 POWER SUPPLY
300 OPERATING UNIT
F GROUNDING SURFACE
Ga FORWARD MOVEMENT

Gb BACKWARD MOVEMENT
Ra NORMAL ROTATION
Rb REVERSE ROTATION
S1, S2, S3 OFFSET AMOUNT
Sig OPERATION SIGNAL

The invention claimed is:

1. A driving wheel comprising:
    a base portion;
    a first shaft rotatably provided with respect to the base portion;
    a rotation member rotatably provided around the first shaft;
    a second shaft provided on the rotation member orthogonally to the first shaft;
    a drive wheel provided at a position offset from a shaft center of the first shaft with respect to the rotation member and rotatable around the second shaft;
    a drive unit provided on the rotation member and configured to rotationally drive the drive wheel;
    a lock mechanism configured to turn into an unlock condition permitting rotation of the rotation member with respect to the base portion, and meanwhile, to turn into a lock condition deterring the rotation of the rotation member with respect to the base portion; and
    a controller configured to control the drive unit and the lock mechanism,
    wherein the controller is configured to control:
        a first operation driving the drive unit while turning the lock mechanism into the lock condition;
        a second operation driving the drive unit while turning the lock mechanism into the unlock condition, and rotating the rotation member around the first shaft along with the drive wheel; and
        a third operation driving the drive wheel around the second shaft by an external force while turning the lock mechanism into the unlock condition, and rotating the rotation member around the first shaft along with the drive wheel; and
    further comprising a driven wheel and a brake mechanism configured to brake rotation of the driven wheel,
    wherein the controller is configured to control the brake mechanism to turn the brake mechanism into a brake-release condition in the first operation, turn the brake mechanism into a brake condition in the second operation, and turn the brake mechanism into the brake-release condition in the third operation.

2. The driving wheel according to claim 1, wherein the second shaft is provided at a position where a shaft center of the second shaft thereof is offset from the shaft center of the first shaft.

3. The driving wheel according to claim 1, further comprising
    a third shaft provided on the rotation member coaxially with the second shaft;
    wherein the driven wheel is rotatably provided around the third shaft.

4. A carriage comprising:
    the driving wheel according to claim 1; and
    a carriage main body on which the driving wheel is attached.

5. An apparatus comprising:
    the driving wheel according to claim 1;
    a carriage main body on which the driving wheel is attached; and
    equipment attached to the carriage main body.

6. The driving wheel according to claim 1, further comprising a rotational-reference position detector configured to detect a reference position related to a relative rotational movement of the rotation member with respect to the base portion.

7. The driving wheel according to claim 1, wherein the controller is configured to control the drive unit and the lock mechanism based at least in part on data from the drive unit.

8. The driving wheel according to claim 1, wherein the brake mechanism is configured to brake rotation of only the driven wheel.

* * * * *